(12) United States Patent
Heinonen et al.

(10) Patent No.: US 7,107,010 B2
(45) Date of Patent: Sep. 12, 2006

(54) SHORT-RANGE RADIO TERMINAL ADAPTED FOR DATA STREAMING AND REAL TIME SERVICES

(75) Inventors: Tomi Heinonen, Tampere (FI); Timo Saarela, Tampere (FI)

(73) Assignee: Nokia Corporation, Espoo (FI)

( * ) Notice: Subject to any disclaimer, the term of this patent is extended or adjusted under 35 U.S.C. 154(b) by 504 days.

(21) Appl. No.: 10/414,138

(22) Filed: Apr. 16, 2003

(65) Prior Publication Data

US 2004/0209569 A1  Oct. 21, 2004

(51) Int. Cl.
H04B 7/00  (2006.01)

(52) U.S. Cl. .................. 455/41.2; 455/461; 455/420; 455/575.2; 455/563; 455/557; 455/569.1; 379/212.01; 379/266.07; 379/309; 370/312; 370/352; 370/329

(58) Field of Classification Search ............... 455/41.2, 455/461, 557, 420, 569.1, 575.2, 563; 370/312, 370/352; 379/212.01, 266.07
See application file for complete search history.

(56) References Cited

U.S. PATENT DOCUMENTS

| | | | |
|---|---|---|---|
| 4,163,123 A | 7/1979 | Brodsky et al. | 179/15 |
| 6,138,003 A | 10/2000 | Kingdon et al. | 455/410 |
| 6,334,052 B1 | 12/2001 | Nordstrand | 455/411 |
| 6,345,047 B1 * | 2/2002 | Regnier | 370/352 |
| 6,614,774 B1 * | 9/2003 | Wang | 370/338 |
| 6,714,778 B1 * | 3/2004 | Nykanen et al. | 455/414.1 |
| 6,845,097 B1 * | 1/2005 | Haller et al. | 370/352 |
| 6,853,851 B1 * | 2/2005 | Rautiola et al. | 455/553.1 |
| 6,885,847 B1 * | 4/2005 | Lumelsky | 455/41.2 |
| 6,885,861 B1 * | 4/2005 | Koskelainen | 455/414.2 |
| 6,928,295 B1 * | 8/2005 | Olson et al. | 455/522 |
| 6,957,086 B1 * | 10/2005 | Bahl et al. | 455/557 |
| 2002/0098878 A1 | 7/2002 | Mooney et al. | 455/550 |
| 2002/0173296 A1 | 11/2002 | Nordman et al. | 455/414 |

OTHER PUBLICATIONS

Miller et al., "Bluetooth Revealed", Prentice-Hall, Inc., Upper Saddle Rive, NJ 07458, ISBN 0-13-090294-2, dated 2002, pp. 234-237.
Bray et al., "Bluetooth Connect Without Cables", Prentice Hall PTR, Upper Saddle River, NJ 07458, ISBN No. 0-13-0066106-6, dated 2002, pp. 283-286.
"Bluetooth Specification Version 1.0 B, Core, Link Manager Protocol" Bluetooth Specification Version, XX, XX, vol. 1, Dec. 1, 1999, pp. 185-244, ZP002174828, p. 195, paragraph 3.3—p. 197; pp. 208, paragraph 3.15- p. 209; and, p. 200- p. 221.
EPO Communication (Sep. 8, 2004).

\* cited by examiner

*Primary Examiner*—Marceau Milord
(74) *Attorney, Agent, or Firm*—Morgan & Finnegan, LLP

(57) ABSTRACT

A local services platform including a server subsystem is connected to one or more APs; an application subsystem and provides headset/terminals (HS) with real-time services. A streaming interface is installed between the server and the application. The HS is capable of being activated and paired with a host device, typically a telephone under standard Link Control Protocol. The HS includes an extra button, when operated, causes the host to place the HS in an "idle" mode. During the "idle" mode, the HS listens to AP inquiries or carries out inquiries. When an AP beacon is detected, the HS requests a HOLD state from the paired telephone and receives streaming data after completing a connection to the AP beacon. When the streaming data is in channels, the HS can switch among the channels or end the transmission by operating the idle button.

35 Claims, 7 Drawing Sheets

Headset Profile Stack Protocol

SHORT-RANGE RADIO TERMINAL ADAPTED FOR DATA STREAMING AND REAL TIME SERVICES

BACKGROUND OF INVENTION

1. Field of Invention

This invention relates to communication devices, systems and methods. More particularly, the invention relates to a short-range radio terminal, system and method adapted for data streaming and real-time services.

2. Description of Prior Art

Short-range communication technology, typically Bluetooth provides synchronous connection oriented (SCO) links capable of delivering 64 kilobytes per second (KPS) channels to active clients. The datastream includes any content, but in general consists of voice. The data stream can be applied to Bluetooth headsets using headset or hands-free profiles. Bluetooth Access Points (AP) serve as Bluetooth voice beacons, i.e., voice streams from the AP to the headset as the active terminal. The Access Point may also provide real time location aware or listening services to the headset. However, the headset must be paired with a host device, e.g., a telephone, before voice streaming or listening services are provided to the headset. Alternatively, the headset can be paired with an AP, and can be dynamically paired any time to any device. Pairing means that two devices have a common Link Key. Even though device A and B are paired, the device A can be also paired with device C. etc. During this state, already paired headsets in active connection to the host cannot receive Bluetooth beacon voice streams or location aware listening services.

It would be desirable to extend the functions of short-range terminal headsets to receive streaming voice or listening services while the headset is paired with a host device. By so doing, headset users will be able to receive a wide variety of new services enhancing the utility and interest in headsets.

Prior art related to short-range terminal headsets receiving streaming data or listening services includes the following:

1. U.S. patent application Ser. No. 2002/0111140, entitled, "Wireless Headset Capable of Automatic Link Connection and Method for Controlling the Same", published Feb. 13, 2001 discloses a wireless headset including a microphone supporting member having a microphone installed and being able to be forwarded to or unforwarded from the main body of the wireless headset, and a sensing device connected to a connector of the microphone supporting member. The sensing device senses whether the microphone supporting member is folded or unfolded. If the microphone supporting member is unfolded, an attempt to register and ID (Identification) of the wireless headset in a counterpart terminal and to connect a Bluetooth™, wireless communication link between the wireless headset and the counterpart terminal is preformed using the Bluetooth™ module.

2. U.S. patent application Ser. No. 2002/0068610, entitled, "Method and Apparatus For Selecting Source Device And Content Delivery Via Wireless", published Jun. 27, 2002 discloses a headset or other interactive device comprising a user interface apparatus, a wireless transceiver, and a switching module; wherein, the wireless transceiver is used for transport of content between the user interface device and a plurality of source devices, and the switching module is coupled to and interposed between the user interface apparatus and the wireless transceiver and is used to select specified source devices for wireless coupling with the user interface.

3. U.S. patent application Ser. No. 2002/0082057, entitled, "System and Method for Utilizing Mobile Communication Terminal as Wireless Headset", published Jun. 27, 2002 discloses a mobile communication terminal as a wireless headset, comprising a personal computer (PC) adapted to access to an internet phone service through an internet network; and mobile communication terminal for performing a function of a wireless headset of the PC when the PC accesses the internet phone service, wherein, the mobile communication terminal have a Bluetooth function. The Bluetooth built-in function makes possible the user of an Internet phone call service. When an operation mode of the mobile communication terminal is set to a headset mode, a speech signal of a user inputted through a microphone is transmitted to the PC directly, via a Bluetooth device and the speech signal of a counterpart inputted to the mobile communication terminal from the PC is applied to a speaker via the Bluetooth device.

4. U.S. Pat. No. 6,334,052 B1, entitled, "Subscription-Based Mobile Station Idle Mode Cell Selection", issued Dec. 25, 2001 discloses subscription-based information in a mobile telecommunications systems utilized to control idle mode operations of a mobile station. In one aspect, cell-related information is broadcast from cells. A mobile station then uses the received cell-related information to determine whether any given cell is part of a predefined service area that is reserved for use by only certain subscribers to the exclusion of other subscribers. The cell-related information may be a cell identifier that uniquely identifies a corresponding cell, or it may alternatively be a service area identifier that uniquely identifies a service that comprises one or more cells. In either case, the mobile terminal makes its determination by accessing a memory such as a Subscriber Information Module (SIM), and retrieving therefrom stored information that defines the predefined service areas. In another aspect, the SIM may store information identifying preferred cells for the mobile station to camp on during idle mode.

5. U.S. Pat. No. 6,138,003 entitled "System and Method For Authorization Of Location Services", issued Oct. 24, 2000 discloses a telecommunications system and method which performs authorization checks prior to allowing a location service to position a mobile terminal within a cellular network. The various checks involve ensuring that the requesting agency has authorization to request positioning of mobile terminals, determining whether positioning of mobile terminals is allowed within the cellular network that the mobile terminal is currently located in, verifying the authenticity of the identity of the mobile positioning center, ascertaining whether the mobile subscriber has allowed the requesting agency to position the mobile terminal, and confirming that all relevant criteria for positioning have been met by both the mobile subscriber and the requesting agency.

6. U.S. Pat. No. 4,163,123 entitled "Electronic Tour Guide System", issued Jul. 31, 1979 provides messages about exhibits in a museum or the like to visitors carrying portable receivers. Audio sources which generate various messages are provided at a central location which are multiplexed and digitized and applied to one or more cables which extend to the covered areas. Receiver-transmitters are located along the cables and are adapted to decode one of the messages and transmit the same via infrared energy into a well defined area adjacent the exhibit, enabling a visitor having a receiver to receive the infrared radiated signal information and hear the message.

None of the prior art discloses or suggest a short-range terminal, typically a Headset adapted for receiving streaming voice or listening services from a voice beacon, typically an Access Point (AP) while in a paired state with a host device, typically a telephone by switching the terminal into a "idle state" where the paired device is in a passive condition, typically a HOLD state and disconnecting from the streaming voice when the host device becomes active.

SUMMARY OF THE INVENTION

A short-range radio terminal, such as a Bluetooth terminal, typically a Headset (HS) in an active state (paired with a telephone or communicating with another device) is set in an "idle mode" and receives streaming data from a streaming data source (e.g. an Access Point (AP) serving as a Bluetooth voice beacon). A local server subsystem is connected to one or more APs and to an application subsystem including a local services platform. A streaming interface is installed between the local server subsystem and an application subsystem. Streaming content (i.e., voice) is stored statically in the local server or even in the APs. The HS is paired with a host device, typically a telephone under standard Link Control Protocol, although the HS can also operate fully independently and does not need to be paired with a host device. The stream is delivered to the HS from the AP voice beacon via a synchronous connected oriented (SCO) link. The HS includes an extra switch which when operated places the HS in an "idle" mode. During the "idle" mode, the HS listens to AP inquiries or carries out inquiries. When an SCO beacon is detected, the HS requests a HOLD state from the paired telephone and receives streaming voice after completing a connection to the AP beacon. During the connection state the, HS may switch among streaming voice channels available from the AP by operating the extra or "idle" switch. Alternatively, the HS can also operate without the telephone. When the HS receives an incoming call while receiving streaming voice, the HS requests a new HOLD period to terminate the streaming voice. Afterwards, the HOLD is terminated and the call activated. When the call is terminated, a new HOLD request is made by operating the "idle" switch and the HS listens to AP inquiries from streaming voice. Real time services are available to the HS from locations equipped with local services platform. The platform receives and re-transmits information, i.e. news or other content to active HSs in the vicinity of the platform or information stored in the platform is broadcast to the HSs. When the AP and HS establish a connection, the AP may also send an event message to the platform. The message may be processed to send a stream to the HS or the message may be re-transmitted to the application subsystem included in or connected to the platform.

An aspect of the invention is a terminal/headset, including a switching apparatus, which when operated, switches the headset into a "idle" state while connected to a paired host device.

Another aspect is a terminal/headset having a terminal ID for use in selecting appropriate streaming data from a database, which enables personalized contact delivery in addition to location aware contact delivery.

Another aspect is a terminal/headset including switching means setting the terminal/headset in a mode to form or end a connection to the AP and/or switching the terminal/headset between different content channels of an AP.

Another aspect is a headset, which can operate independently from a terminal and after pairing with a host device receive streaming data from an Access Point while in an idle mode.

Another aspect is a synchronous connection-oriented profile for a headset to automatically set the headset in a mode to form or end a connection to the AP and/or switch the headset between different content channels of an AP.

Another aspect is a headset receiving streaming data, while paired with a host device an in an idle mode, and able to communicate with the host device between data packets.

Another aspect is a host device including a User Interface for setting a paired HS in a "beacon listening mode" and/or switching the HS between available content channels from an AP.

Another aspect is a host device as a master device including a list of available AP channels and enabling a headset user to graphically select an appropriate AP content channel.

Another aspect is a host device establishing contact with an AP and delivering AP content to a paired headset.

Another aspect is the addition of a streaming interface between a local service subsystem and an application subsystem providing streaming data to Access Points and if there are active terminals connected to the Access Points, the stream is delivered there via SCO links.

Another aspect stores previously loaded stream content in a local server and thereafter delivers the content to active clients via Access Points, the Access Points being identified by their addresses and the stream database content having the same Access Point thereby assuring appropriate content is delivered to appropriate Access Points.

DESCRIPTION OF THE DRAWINGS

The invention will be further understood from the following detailed description of a preferred embodiment, taken in conjunction with an appended drawing, in which.

DESCRIPTION OF PREFERRED EMBODIMENT

Figure 1:
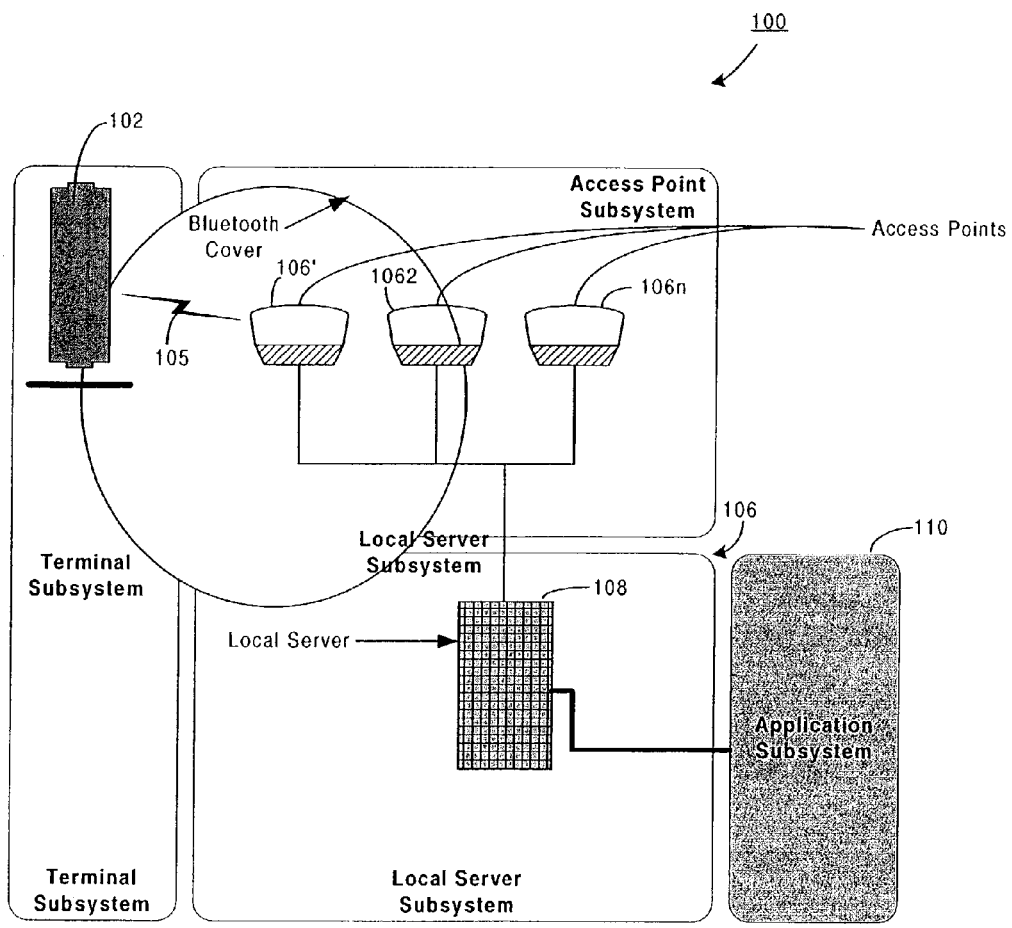
FIG. 1 is a representation of a short-range radio headset/terminal linked to a location aware based server via an Access Point for receiving streaming voice or location aware services and incorporating the principles of the present invention.

A brief description of short-range wireless systems is believed appropriate before describing the preferred embodiment.

Short-range wireless systems have a typical range of one hundred meters or less. They often combine with systems wired to the Internet to provide communication over long distances. The category of short-range wireless systems includes wireless personal area networks (PANs) and wireless local area networks (LANs). They have the common feature of operating in unlicensed portions of the radio spectrum, usually either in the 2.4 GHz Industrial, Scientific, and Medical (ISM) band or the 5 GHz Unlicensed-National Information Infrastructure (U-NII) band. Wireless personal area networks use low cost, low power wireless devices that have a typical range of ten meters. The best known example of wireless personal area network technology is the Bluetooth Standard, which operates in the 2.4 GHz ISM band. It provides a peak air link speed of one Mbps and a power consumption low enough for use in personal, portable electronics such as PDAs and mobile phones. The Bluetooth Special Interest Group, *Specification of The Bluetooth System*, Version 1.0B, Volumes 1 and 2, December 1999, describes the principles of Bluetooth device operation and communication. The preferred embodiment will be described in terms of the Bluetooth Standard.

Briefly, Bluetooth devices are designed to find other Bluetooth devices within their ten-meter radio communications range and to discover what services they offer, using a service discovery protocol (SDP). The SDP searching function relies on links being established between the requesting Bluetooth device in a client role and the responding Bluetooth device in a server role. Once a link has been established, it can be used to find out about services in the responding Bluetooth device and how to connect to them.

A connection between two Bluetooth devices is initiated by an inquiring device sending out an inquiry message searching for other devices in its vicinity. Any other Bluetooth device that is listening by means of conducting an inquiry scan, will recognize the inquiry message and respond. The inquiry response is a message packet containing the responding device's Bluetooth Device Address (BD_ADDR). A Bluetooth device address is a unique, 48-bit IEEE address that is electronically engraved into each Bluetooth device.

The inquiring device uses the information provided in the inquiry response packet, to prepare and send a paging message to the responding device. To establish a connection, the inquiring device must enter the page state. In the page state, the inquiring device will transmit initial paging messages to the responding device using the access code and timing information acquired from the inquiry response packet. The responding device must be in the page scan state to allow the inquiring device to connect with it. Once in the page scan state, the responding device will acknowledge the initial paging messages and the inquiring device will send a paging packet that provides the clock timing and access code of the inquiring device to the responding device. The responding device responds with a page acknowledgment packet. This enables the two devices to form a connection and both devices transition into the connection state. The inquiring device that has initiated the connection assumes the role of a master device and the responding device assumes the role of a slave device in a new ad hoc network piconet.

Each piconet has one master device and up to seven active slave devices. All communication is directed between the master device and each respective slave device. The master initiates an exchange of data and the slave responds to the master. When two slave devices are to communicate with each other, they must do so through the master device. The master device maintains the piconet's network clock and controls when each slave device can communicate with the master device. Members of the ad hoc network piconet join and leave as they move into and out of the range of the master device.

However, other examples of short range networks designed for either the 2.4 GHz ISM band or the 5 GHz U-NII may incorporate the principles of the present invention and include: (1) IEEE 802.11 (a) and (b) described in the IEEE 802.11 Wireless Standard, described in three parts IEEE 802.11; 802.11 (a) and 802.11 (b); (2) HIPERLAN Type 1 described in the publication *HIPERLAN Type 1 Standard*, ETSI ETS 300652, WA2 December 1997; (3) *HIPERLAN Type 2 Data Link Control (DLC) Layer; Part 4. Extension for Home Environment*, ETSI TS 101 761-4 V!.2.1(2000-12); (4) IEEE 802.15 Wireless Personal Area Network (WPAN) Standard; (5) Infrared Data Association Standard (IrDA); (6) the Shared Wireless Access Protocol (SWAP) standard; (7) Japanese $3^{rd}$ Generation wireless standard and (7) the Multimedia Mobile Access Communication (MMAC) Systems Standard of the Japanese Association of Radio Industries and Businesses.

Now referring to FIG. 1, a location aware services system 100 provides listening services to a mobile terminal 102 via Access Points 106$^1$, 106$^2$ . . . 106$n$ and air link 105. The Access Points are coupled to a Local Services Platform 106 including a local server 108. An application subsystem 110 is coupled to the server 106. Details of the system 100 in providing listening services to the terminal 102 are described in U.S. Ser. No. 10/334,449 filed Dec. 30, 2002 assigned to the assignee of the present invention and fully incorporated herein by reference. However, to provide streaming data to the terminal 102, a modification is required to add a "streaming data" interface (not shown) between the server 108 and the application subsystem 110. A streaming data interface is described in the text "The MPEG Handbook" by John Watkinson, published by Focal Press, Woburn, Mass. (2001)(ISBN 0 240 51656 7) at pages 35–38. The interface provides the transfer of digital data to the terminal 102 via the platform and Access Points as a steady and continuous stream of packetized data. A number of streaming technologies are available. The streaming can be TCP/UDP/IP based. The local server 108 can provide more than one interface. Each stream is directed either to all APs or to a set of previously defined APs. The form of the stream can be video or IP, digital sound via PCM, catalog voice digitized in the local server. The server may transmit streaming data to the terminal(s) via various profiles, including Headset, Handsfree, Intercom or PAN. The streams are delivered by synchronous connection-oriented (SCO) link. Either real-time stream or previously stored content/stream can be forwarded directly to a particular terminal, hence, enabling personalized content. An AP can offer seven different stream channels with each of the short-range communication modules installed within the AP. If the channels do not contain private content, a terminal can switch among the channels. However, the terminal is adapted to search and discover AP's transmitting streaming data of interest and connect to the AP while paired to a host device, typically a mobile telephone until a call is received by the paired terminal.

Figure 2:
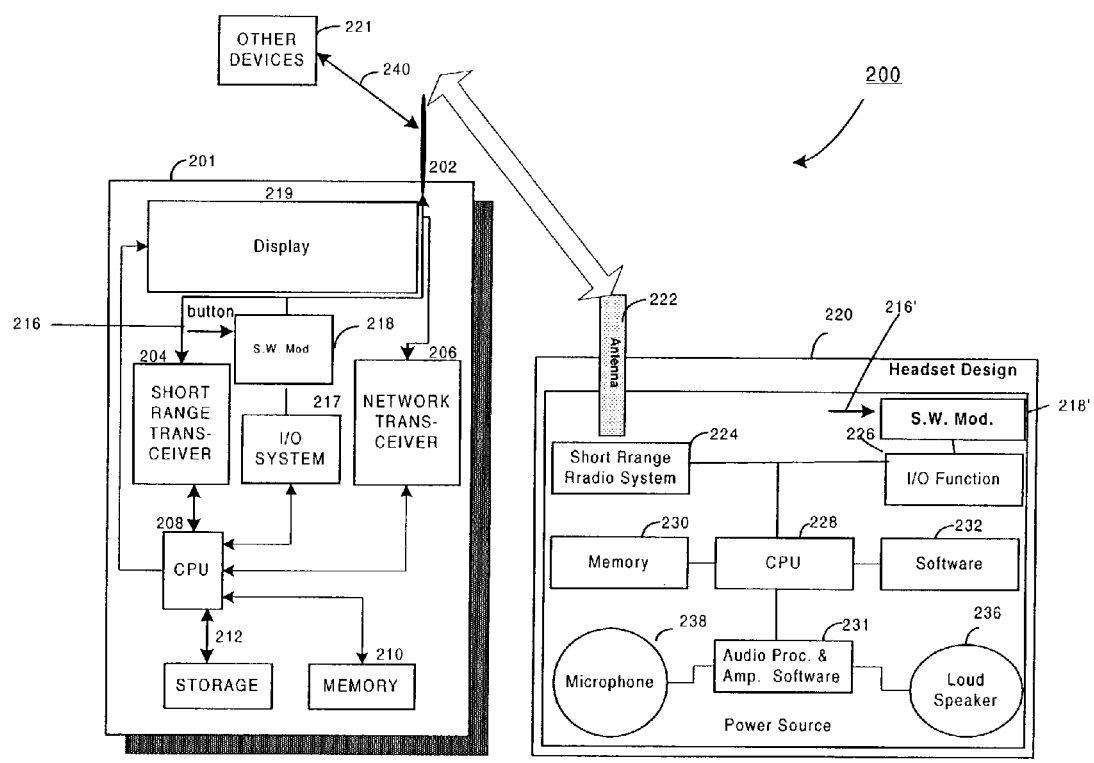
FIG. 2 is a representation of the short-range terminal and headset design in FIG. 1 for receiving streaming voice or location aware services while paired with a host device.

FIG. 2 shows the mobile terminal 102 (FIG. 1) modified as a headset/terminal 200 having Bluetooth search and discovery features, previously described, and enabling a mobile terminal 201 and a headset 220 to operate jointly or the headset to operate independent of the terminal. It is believed appropriate to describe the headset/terminal 200 before describing the implementation of the system 100 in providing listening services as streaming data to the terminal 102, modified as headset/terminal 200, able to search, discover, connect to AP's and select channels in streaming data while paired to a host device.

In a paired state the host device (mobile terminal 201) and the headset terminal 220 share a link based on a common link key after link key negotiation and authentication where the host device is the master device and the headset terminal 220 is the slave device. Additional details on pairing are described in the text "*Bluetooth Connect Without Cables*", Second Edition, by J. Bray et al, published by Prentice Hall PTR, Upper Saddle River, N.J. 07458, 2002 at pages 283–286.

Figure 3:
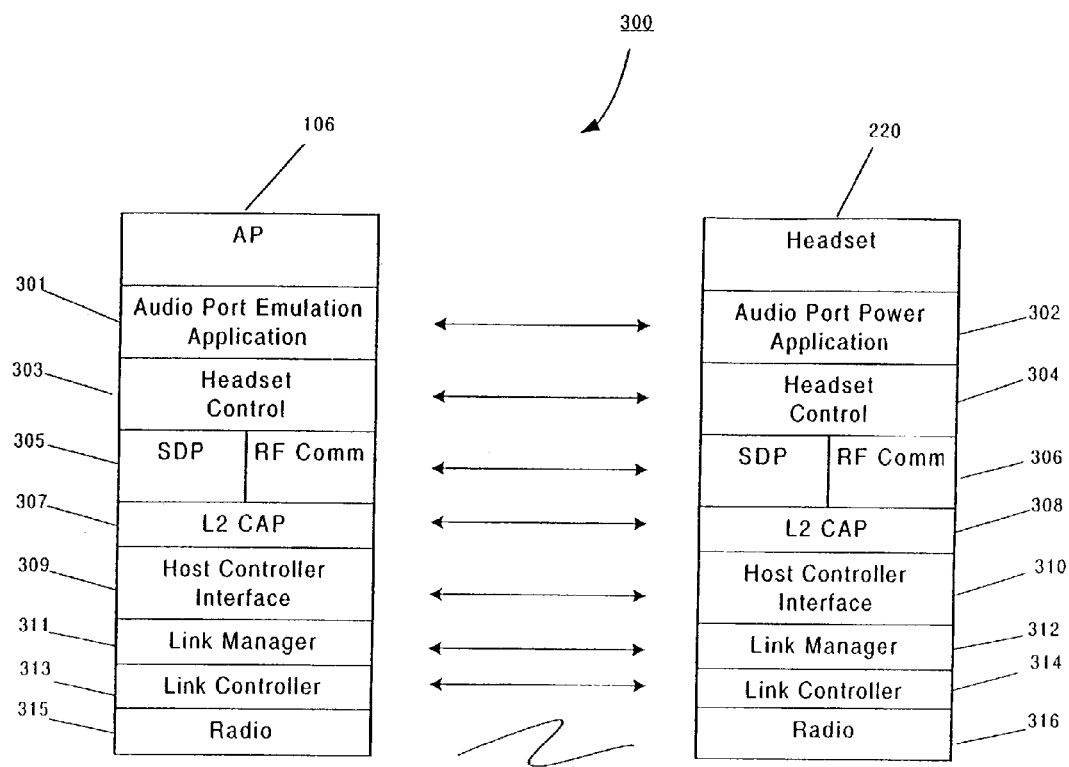
FIG. 3 is a prior art representation of a headset profile for communicating with the Access Point of FIG. 1.

In FIG. 2, the terminal 201 is worn or carried by the user and includes an antenna 202, which may be linked to other devices 221, such as APs via airlink 240. The antenna 202 module is coupled to a short-range transceiver 204 for interacting with e.g. the APs or other devices in discovering, connecting to and receiving all kinds of short-range radio communication. A network transceiver 206 is also connected to the antenna 202 module for interacting with base stations and other mobile devices at distances greater than 100 meters. It should be noted that the terminal 201 is a functional representation of a mobile terminal. There are actually two separate antenna modules, wherein one is dedicated to short-range communication and the other is dedicated to network communication. A processor 208 interacts with the transceivers 204 and 206 executing network and short-range communications protocols with the other terminals and Access Points. The network and short-range communication protocol stacks, along with an operating system are stored in a memory 210, typically a ROM or in a storage device 212, typically a RAM. While the operation of the headset/terminal 200 will be described in terms of the Bluetooth protocols, the protocols for other short-range communication systems, described above, may be substituted. The Bluetooth network protocols are described in the text "*Bluetooth Connect Without Cables*", supra at pages 5–6. The short-range communication profile may be a headset or handsfree profile. A headset profile 300 is shown in FIG. 3. Briefly, the headset profile includes an audio gateway, e.g. master device/Access Point having an audio port emulation layer 301 emulating an audio port and interacting with an audio port driver application layer 302 in the headset. Headset control layers 303 and 304 interact in setting up a Bluetooth connection using SDP/RFCOMM layers 305 and 306. L2CAP layers 307 and 308 interact for implementing communication between the gateway and the headset. The host controller interface modules 309 and 310 together with link managers 311, 312 and link controller modules 313, 314 implement Host Control Interface protocols to transfer data via radio modules 315 and 316 across various physical connectors. Additional details relating to the headset profile are described in the text "*Bluetooth Revealed*" by Miller et al., published by Prentice Hall, PTR, Upper Saddle River, N.J. 07458, dated 2001 (ISBN 013-090294-2) at pages 234–237.

Figure 2A:
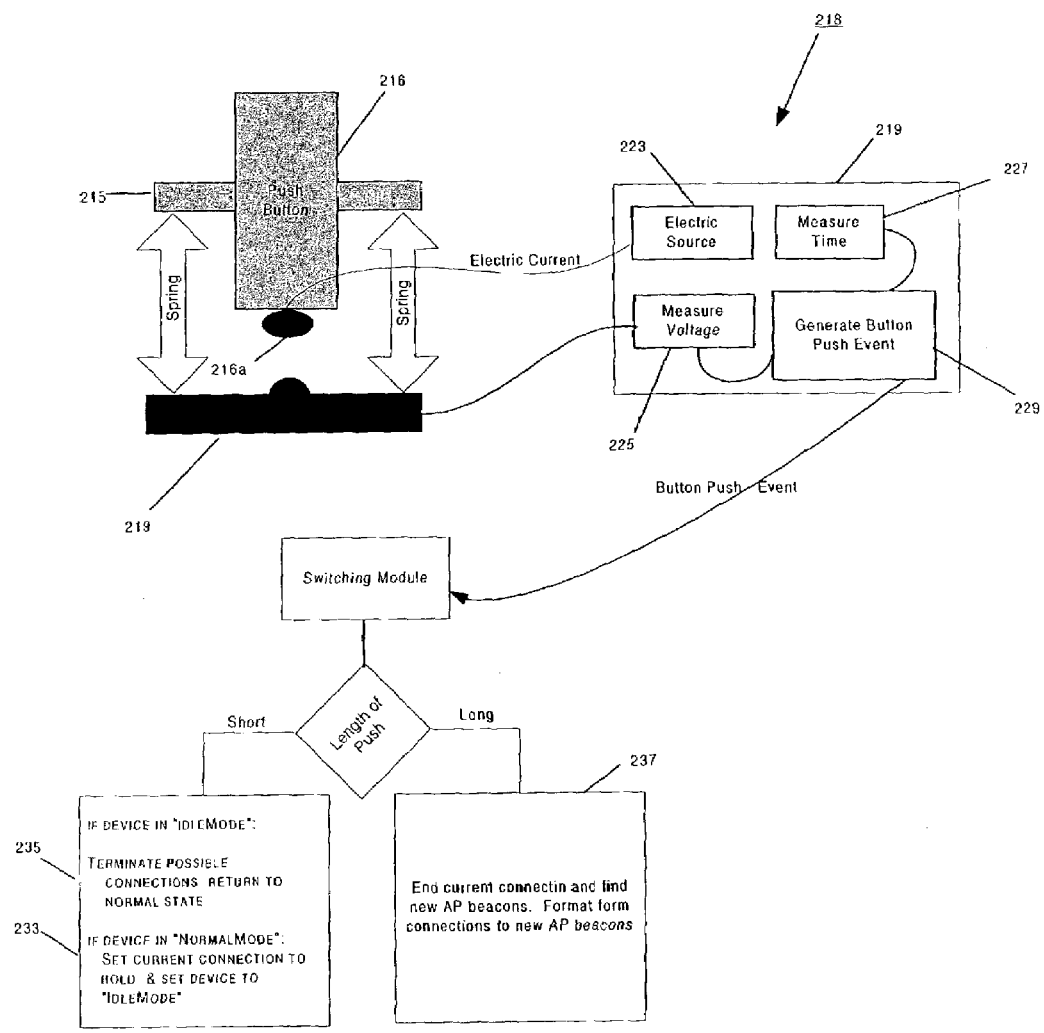
FIG. 2A is a representation of a switching module for initiating or terminating an "idle mode" for the terminal and headset of FIG. 2.

Returning to FIG. 2, an I/O system 217 is coupled to the processor 208. A switching module 218 connected to the I/O circuit is operated by a push button 216 at a terminal interface 215, as shown in FIG. 2A. The push button is spring controlled and engages a base plate 219 with a contact member 216a. The base plate includes an electric source 223 which is activated by the contact member to supply voltage to a circuit 225 for measuring the contact voltage and a circuit 227 for measuring the time of contact. A circuit 229 generates a push button event according to the length of the pushbutton stroke, as determined by the voltage and time measurements. If the circuit 229 detects the stroke length is short as determined by voltage and time measurements, it determine if the headset terminal is in a normal or paired mode or an "idle mode". In the normal mode, the switching circuit initiates a request message to the paired headset terminal 220 in an operation 233 to set the headset terminal into an idle state, wherein the connection between the terminal 201 and the headset terminal is set typically to a HOLD mode (See *Bluetooth Connect Without Cables*, supra at pages 301–302, supra). During the idle state, the headset 220 may send inquiry or search messages and page or discover messages to establish connections with Access Points transmitting streaming data, while keeping the non-active connection with the terminal 20,1 as will be described in more detail hereinafter. It should be noted that if the headset terminal 220 serves as a slave device, it cannot actively send inquiry messages.

If the circuit 229 determines the headset terminal is in the "idle mode", the circuit in an operation 235 terminates the connections to the Access Point beacon and returns the headset terminal to the normal mode.

If the circuit 229 detect a long pushbutton stroke by the voltage and time measurements, the circuit in an operation 237 ends the current Access Point connections and finds and forms new connections to new Access Points.

The module 218 is further designed to enable a user to select among channels of streaming data transmitted by the Access Point to which the headset terminal 220 is connected. In one embodiment, multiple depressions of the idle button change the tuning frequency of the short-range transceiver to select a channel of choice. A display 219, connected to the processor 208, enables the user to view the process in interacting with the headset terminal 220 and the Access Point to which the headset terminal 220 is connected (e.g. any of the Access Points $106^1 \ldots 106^N$ (see FIG. 1)). A power supply (not shown) provides the operating voltages and currents for the terminal elements Returning to FIG. 2, the headset 220, typically resides on the user's head, and is capable of operations of searching, discovering, connecting to and selecting channels of streaming data transmitted by an Access Points after pairing to the terminal device 201. The headset includes an antenna 222 for communicating with the terminal 201 via short-range radio link and with an Access Point 106 transmitting streaming data. In an alternative embodiment, the headset terminal is capable of operating independently. Then, the antenna 222 is also coupled to the Access Points. A short-range radio system 224 connected to the antenna 222 processes data in discovering, connecting to and receiving data captured by the antenna 202 from the terminal antenna 202 or an Access Point. An I/O block 226 performs ancillary functions in inputting or buffering data processed by the radio system 224. The I/O module is connected to a switching module 218 including an idle button 216', which when operated initiates/terminates the idle mode and may select among channels of the streaming data transmitted by an Access point. In some embodiments, the headset terminal may be equipped also with a dedicated channel selection button (not shown).

The processor 228 under the control of an operating system (not shown) implements the short-range communication protocols stored in memory 230 for interacting with the host device or an Access Point. In one embodiment, the headset protocol 300 shown in FIG. 3 may be employed to interact with a gateway, e.g. a host device or an Access Point.

The processor also executes software instructions 232 for placing the headset into an idle state or mode after connection to the paired host device (terminal 201). The instructions generate a request to the host or master device for an idle state in which a passive, or non-active connection, e.g. HOLD is established with the host device. However, the host device is capable of activating the non-active connection with the headset at any time, particularly when a third party call is received by the host for the headset. While in the idle state, the headset may search for an AP transmitting streaming data while continuing to maintain a non-active connection to the paired host device 201. When an AP streaming beacon is detected, the headset continues the non-active connection to the host device and completes a connection to the AP beacon. The streaming data from the AP is received by the short-range radio system 224 and passed to an audio processing amplifier unit 231 via the processor 228 after depacketizing the streaming data using well known processes. The Audio unit 231 assembles the packets into an audio signal, which is provided to a loud speaker 236 as an output to the user. The text "The MPEG Handbook", supra at pages 42–45 provide details for assembling audio signals from the packets. A microphone 238 is connected to the audio processing unit 231 for responding to incoming calls from the host device 221.

Figure 4:
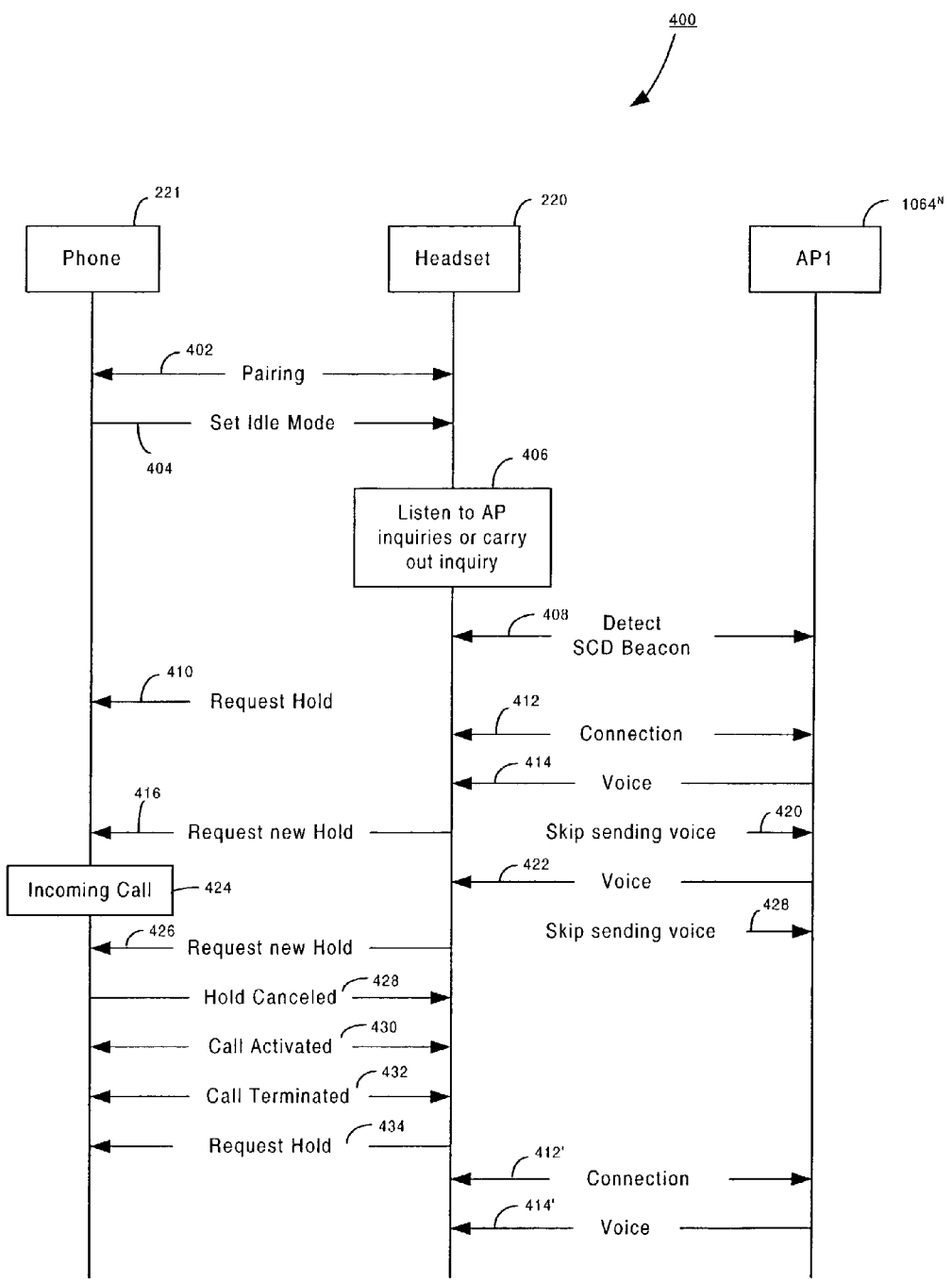
FIG. 4 is a message flow diagram of the headset of FIG. 2 interacting with a host device and an Access Point to receive streaming voice or location aware services while in an idle mode paired with a host device.

FIG. 4 in conjunction with FIGS. 1 and 2 will describe a message flow process 400 for the headset terminal 220 in pairing with the host device 221, e.g. a phone to establish an idle state for searching, discovering, connecting to the Access Point 106$^N$ for streaming data and selecting among the channels of the streaming data.

A pairing message flow 402 between the headset and host device generates a shared link between the host device and the headset. After authentication, the host device serves as the master device and the headset as the slave device.

The user may depress the button 216 on the headset user interface or alternatively on the host terminal user interface, designated as an "idle" button, which activates the switching module 218 to communicate a request message (not shown) between the host device and the headset for an idle state. When in the idle state, the headset and host connection is passive or non-active, e.g. a HOLD and the headset no longer actively listens to packets from the host. A set idle mode message 404 may be sent by the host to the headset, which places the headset in the passive or non-active connection state, e.g. HOLD, with the headset being discoverable via an Inquiry Scanning and connectable via Page Scanning to another device, typically a streaming data beacon from an access point. However, the host device may activate the paired connection with the headset at any time, particularly if an incoming call is received by the host device for the headset. It should be also noted that the host device may also control the headset while in "idle" mode. A user of the host device is capable of selecting between channels by using the user interface including the display and input buttons of the host device to instruct the headset to request another channel from a streaming Access Point.

While in the idle mode state, the headset listens to AP inquiries or carries out inquiries using the service discovery protocol in an operation 406. It should be noted that if the headset serves as a slave device, it cannot actively send inquiry messages (i.e. search for new connections). Bluetooth service discovery protocols are described in the text, "*Bluetooth Connect Without Cables*", supra at pages 96–223.

After the headset detects a streaming (synchronous-oriented connection (SCO)) Access Point as a result of exchanged inquiry messages 408 between the headset and the Access Point, a request hold message 410 is transmitted to the phone by e.g. depressing the idle button (216). The phone responds by extending the passive, non-active state of the paired connection between the phone and the headset. Connection messages 412 are exchanged between the headset and the Access Point, and after the connection is established, the access point transmits streaming data 414, typically voice to the headset through a SCO link. The details of connection establishment between the headset and the Access Point are described in the text, "*Bluetooth Connect Without Cables*", supra, pgs. 151–175. Alternatively, the connection details can be handled automatically using a special headset beacon profile and the software instructions 232 implemented by the processor 228.

During the streaming data transmissions messages 414, the headset may communicate with the phone between data packets. In the case of synchronous connection-oriented (SCO) packets, the SCO links do not apply retransmission and the SCO links consume only about fifty percent of the time. The headset has time to communicate with the phone between the SCO packets. Alternatively, the headset enters into the HOLD state with the Access Point for several milliseconds and activates the connection to the phone or vice-versa.

Where the Access Point is capable of transmitting channels of streaming data, the switching elements 218, 218' may be operated by e.g. multiple depressions of the idle button to switch the headset among the channels.

When the timed interval of the non-active connection or hold state ends, the headset may transmit a request message 416 for a new non-active or hold state and during this period it may transmit a skip sending data message 420 to the Access Point. After a new HOLD state is established, the headset re-establishes the connection to the AP to begin receiving streaming data messages 422.

When an incoming call 424 to the headset is received, the phone or master device activates the connection to the headset. A new request for hold message 426 is transmitted to the host device to provide time for the headset to send a skip sending voice message 428. The connection to the AP is terminated and the streaming data ends.

The phone sends a "hold cancelled" message 428 to the headset and proceeds to exchange caller activation messages 430 using telephone protocol specification (TSC or TSC-BIN) described in the text of "Bluetooth Connect Without Cables", supra, pgs. 251–271.

When the call is terminated, the phone and the headset exchange call termination messages 430, which returns the phone and headset to a paired state enabling the headset to send a "request hold" message 434 to retransmit connection messages 412 to restore data messages 414'.

At any time, the headset may terminate the streaming data transmissions by pressing the idle button to re-activate the active state of the paired connection and terminate the idle state of the headset.

In another embodiment, if the terminal user interface is in the host or phone, a list of available channels can be displayed at the terminal and the user can graphically select among the available channels. Also, the phone interface may be used to set the headset into a beacon listening mode.

In another embodiment, the headset 220 can be paired with an access without the need for the terminal 201. The switching device 218 included in the headset activates the speak and listening mode 408. By pressing the idle button e.g. two seconds at a time, the user can separate the speak and listen mode from normal call establishment.

In another embodiment, the phone connects to the Access Point after detection of an SCO beacon. The Access Point content is delivered to the phone for retransmission to the headset over the paired connection. The switching of channels of the streaming data can be handled by the phone.

Now returning to FIG. 1, the headset/terminal 220 can receive personalized services from the platform 106 after the user or terminal device is authenticated.

In one embodiment, the headset terminal device "personalizes" itself for a service by storing personalization information into the headset/terminal. The personalization content can contain key words or other user preferences capable of authenticating interest and the like. The platform transmits content to the Access Point in an inquiry state. The headset/terminal listens for and responds to inquiries. The platform server uses the headset/terminal address and clock estimate to send its pages to the headset/terminal. The headset/terminal matches the keywords to the paging content and enters a slave response based on a match or rejects the connection if a mismatch occurs.

Where the personalization information is stored to a service provider, the service provider is responsible to ensure that appropriate content is delivered to the terminal. Where the personalization information is stored at the terminal, the terminal and provider must exchange such information in connection formation based on the SDP of Bluetooth, Obex packet or the like. In the case of private personalization content delivery, only the correct terminal can gain access to the content after pairing, authentication and encryption are applied to the content.

In another embodiment of providing real-time services to the headset/terminal, the system stores previously loaded stream content to the local server 108 and delivers the content to active clients via APs. Each AP can be identified from the AP_ID (e.g. MAC address of the AP) and appropriate content to the appropriate AP. Also, the terminal ID (e.g. terminal address) can be applied in selecting appropriate content from a database, which enables personalized content delivery in addition to location aware content delivery. For example, a voice message to a friend can be stored in a specific place (e.g., cover of Access Point x). The friend receives the message only in the same place the message was stored.

In still another embodiment, an Access Point sends an event message to a local server when a terminal forms a connection to the Access Point or vice-versa. The server can process the event (i.e., sending a stream to the terminal) or re-transmit to the application domain. The event message consists of the following elements:

Event Message [Terminal identification (e.g., BD_ADDR or other), Terminal Location (e.g. AP_ID), IP Number and Port to the Terminal's Streaming Interface/audio/video]

Figure 5:
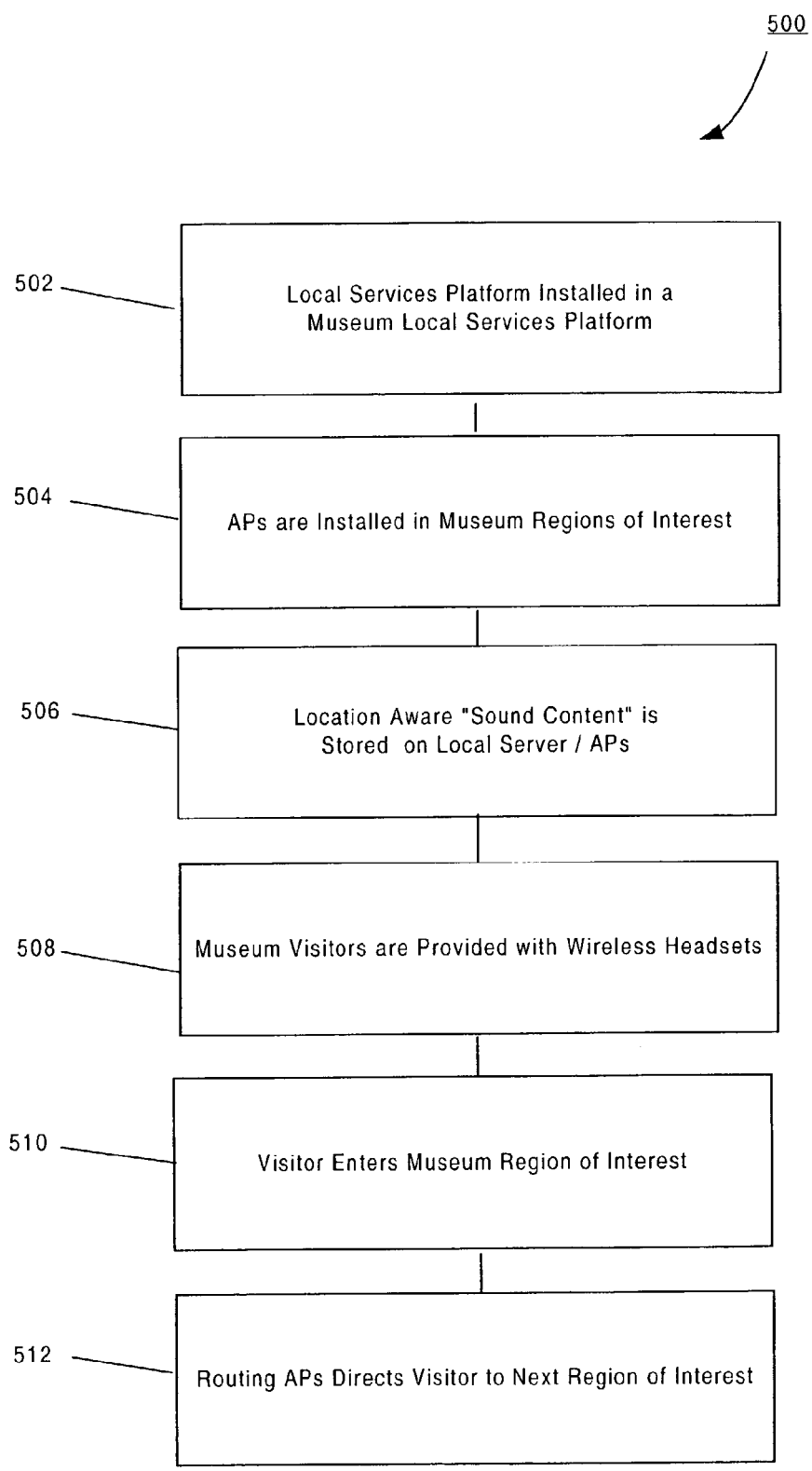
FIG. 5 is a flow diagram of one embodiment of a headset design of FIG. 2 receiving location aware services in the system of FIG. 1.

An example of personalized, time-aware, location aware, real-time services is disclosed in process 500 described in FIG. 5 in conjunction with FIGS. 2 and 4.

In block 502, a Local Services Platform 100 is installed in a museum.

In block 504, Access Points 106 are installed in regions of interest to visitors, (e.g. besides famous paintings) and routing points for directing the visitors through the museum.

In block 506, location-aware sound content related to the regions of interest and routing is stored on the local server 108 or at the Access Points 106 for broadcast of streaming audio in an AP beacon.

In block 508, visitors are provided with headsets/terminals 200 and depress the idle button to set the headset/terminal in a discoverable/connectable for automatic connection to an AP 106.

In block 510, the visitor enters a region of interest. The headset/terminal automatically connects to the AP. The sound content stored in the local server is streamed to handset/terminal after automatic connection to the AP. The sound content ends when the visitor departs the region of interest or depresses the idle button to disconnect from the AP.

It should be noted that the APs may have several channels available servicing client devices, which results in a system wherein the same information may be transmitted to several client devices, wherein the client devices could receive the same information in different stages. This means that when a certain headset terminal enters an AP coverage area, it may connect to the AP and start receiving the SCO transmission while other terminals may have already been receiving the same transmission for some time.

In block 512, the visitor is directed to the next region of interest by routing APs installed in the museum corridors, provided the handset/terminal is in a discoverable/connectable state.

Block 510 is repeated at the next and other regions of interest until the visitor disconnects from the AP and returns the headset/terminal to the museum.

Figure 6:
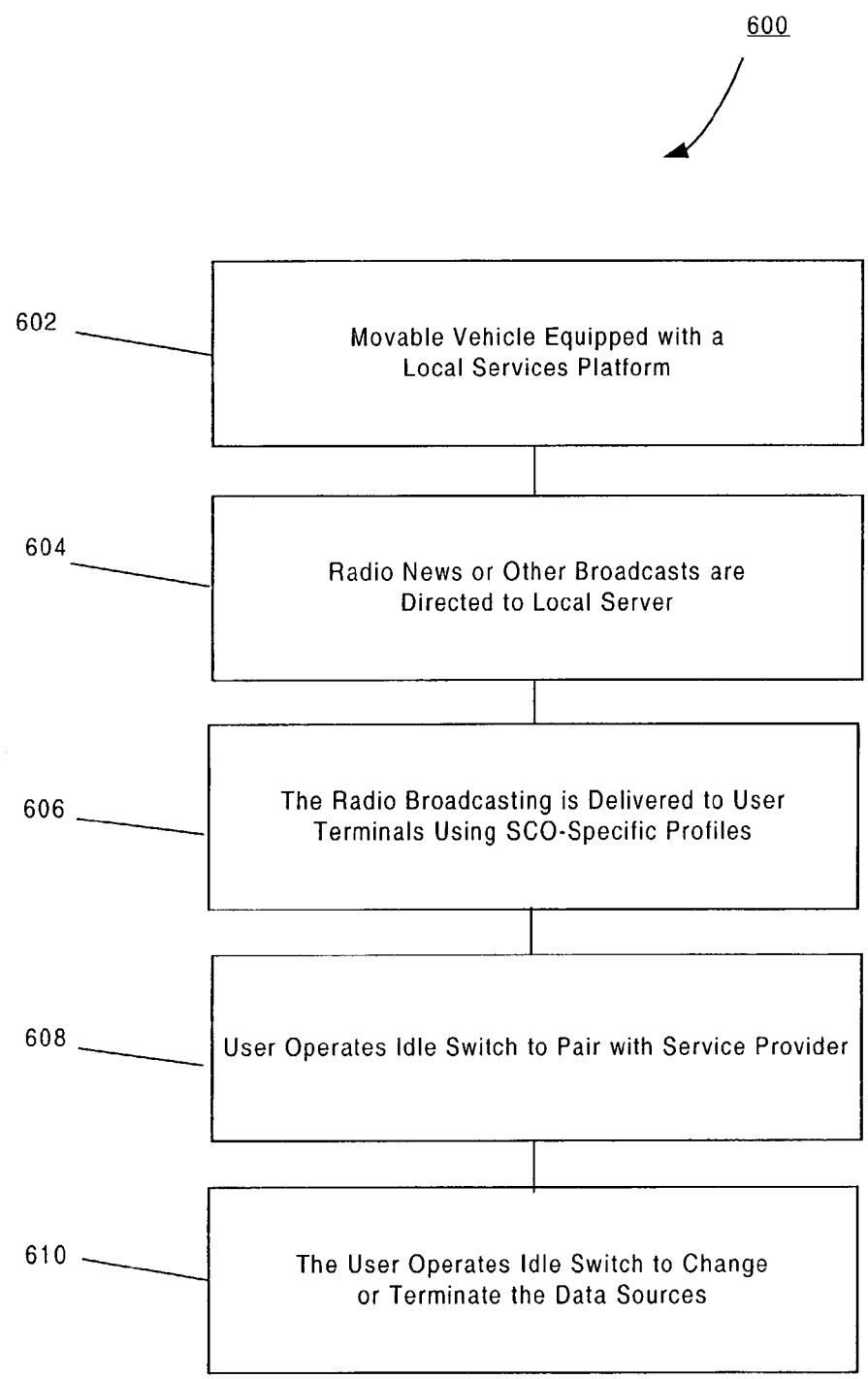
FIG. 6 is another embodiment of the headset design of FIG. 2 receiving location aware services in the system of FIG. 1.

FIG. 6 describes a process 600 which provides a user with streaming data (e.g., news, music, information) while in a traveling state (e.g. train, bus, airplane)

In block 602, a Local Services Platform 100 is installed in or on a movable vehicle for reception of radio station broadcasts.

In block 604, the Local Services Platform receives music, news and other information from a radio broadcast and transmits the content as an AP beacon 106 providing streaming data in channels to users using SCO specific profiles.

In block 606, a user equipped with a headset/terminal 200 sets the terminal 200 in a discoverable/connectable state by operating the idle button and automatically connecting to the platform using SCO profiles to receive the streaming data. The user operates the idle button to select a channel of choice among the streaming channels.

In block 608, the user operates the idle button to pair the headset/terminal with a service provider, which receives and provides the streaming data to the user.

In block 610, the user operates the idle button to switch among the platform channels or end the reception of streaming data.

While the short-range terminal adapted for voice streaming and location aware services in real-time has been described in terms of a preferred embodiment, various changes can be made therein without departing from the spirit and scope of the invention, as defined in the appended claims, in which:

We claim:

1. A short-range wireless communication terminal adapted for receiving streaming data, comprising:
   a) a short-range radio communication protocol stack enabling the terminal to interact with other terminals and Access Points using a short-range radio communication packet structure and link controller states;
   b) switching means for switching the terminal into an "idle" state in which a non-active connection is established with a paired device for enabling a connection for receiving of streaming data from a streaming data source while maintaining a non-active connection to the paired device; and
   c) communication apparatus for connecting to and receiving the streaming data from the streaming data source via the short-range communication protocol while maintaining the non-active connection to the paired device.

2. The terminal of claim 1 further comprising:
   d) terminating apparatus terminating the connection for receiving streaming data after receiving an activation request from the paired device.

3. The terminal of claim 1 further comprising:
   e) a profile stored in the short-range protocols for automatic connection of the terminal to an Access Point transmitting streaming data.

4. The terminal of claim 1 wherein operation of the switching means switches the terminal among data stream channels.

5. The terminal of claim 1 wherein operation of the switching means activates the terminating apparatus for terminating the connection for receiving streaming data.

6. The switching means of claim 1 wherein:
   a) a push button is spring controlled and engages a base plate 219 with a contact member 216*a*;
   b) an electric source 223 which is activated by the contact member to supply voltage to a circuit 225 for measuring the contact voltage and a circuit 227 for measuring the time of contact; and
   c) a circuit 229 generates a push button event according to the length of the pushbutton stroke, as determined by the voltage and time measurements.

7. The switching means of claim 6 wherein if the circuit 229 detects the stroke length is short as determined by voltage and time measurements, the circuit 229*t* determines if the headset terminal is in a normal or paired mode or an "idle mode".

8. The switching means of claim 7 wherein in the normal mode, the switching circuit initiates a request message to the paired headset terminal 220 in an operation 233 to set the headset terminal into an idle state, wherein the connection between the terminal 201 and the headset terminal is set typically to a HOLD mode.

9. The switching means of claim 8 wherein during the idle state, the headset 220 may send inquiry or search messages and page or discover messages to establish connections with Access Points transmitting streaming data, while keeping the non-active connection with the terminal 20.

10. The switching means of claim 9 wherein If the circuit 229 determines the headset terminal is in the "idle mode", the circuit in an operation 235 terminates the connections to the Access Point beacon and returns the headset terminal to the normal mode.

11. The switching means of claim 10 wherein If the circuit 229 detect a long pushbutton stroke by the voltage and time measurements, the circuit in an operation 237 ends the current Access Point connections and finds and forms new connections to new Access Points.

12. The switching means of claim 11 wherein a user is enabled to select among channels of streaming data transmitted by the Access Point to which the headset terminal 220 is connected by multiple depressions of the idle button changing the tuning frequency of the short-range transceiver to select a channel of choice.

13. A system enabling a short-range wireless communication terminal to receive streaming audio data, comprising:
   a) a short-range radio communication protocol stack enabling a terminal to interact with other terminals and Access Points using a short-range radio communication packet structure and link controller states;
   b) a local server system linked to the Access Points;
   c) an application subsystem linked to the server via a streaming voice interface;
   d) switching apparatus switching the terminal into an "idle" state while maintaining a non-active connection to a paired device;
   e) transmitting apparatus delivering streaming audio to terminals in an active state and linked to an Access Point Beacon transmitting the streaming audio; and
   f) terminating apparatus terminating the streaming audio to the terminal when a terminating request is received from the terminal.

14. The system of claim 13 further comprising:
   g) means storing previously loaded stream content in the local server and thereafter delivering the content to active clients via Access Points, the Access Points being identified by their addresses and the stream database content having the same Access Point thereby assuring appropriate content is delivered to appropriate Access Points.

15. The system of claim 13 further comprising:
   h) a streaming interface installed between the local server system and the application subsystem providing streaming data to Access Points and if there are active terminals connected to the Access Points, the stream is delivered there via synchronous connection-oriented links.

16. The system of claim 13 further comprising:
   i) apparatus terminating the streaming audio to the terminal when the terminal receives a phone call.

17. The system of claim 13 further comprising:
   j) apparatus for selecting among channels of the Access Points providing streaming audio.

18. A method of transmitting streaming audio to a Bluetooth terminal comprising the steps of:
   a) a Bluetooth terminal including a Bluetooth protocol stack paired with a terminal in an active state in which a non-active connection is established with the active terminal;
   b) switching the Bluetooth terminal into an "idle" state;
   c) listening to Access Point inquiries by the Bluetooth terminal;
   d) detecting a synchronous connection oriented beacon transmitting streaming audio by Access Points;
   e) requesting a HOLD from the active terminal; and
   f) connecting the Bluetooth terminal to the Access Point Beacon to receive streaming audio.

19. The method of claim 18 further comprising the steps of:
   g) receiving a call by the Bluetooth terminal from the active terminal;
   h) requesting a new HOLD from the active terminal;
   i) terminating the streaming audio to the Bluetooth terminal;
   j) canceling the HOLD and activating the call to the Bluetooth terminal from the active terminal;
   k) terminating the call from the active terminal to the Bluetooth terminal; and
   l) returning to step a).

20. The method of claim 18 further comprising:
   m) switching the Bluetooth terminal among data stream channels provided by the Access Point.

21. The method of claim 18 further comprising:
   n) transmitting streaming audio to the active terminal for re-transmission to the Bluetooth terminal in a paired state with the active terminal.

22. A short-range wireless headset apparatus adapted for receiving streaming data, comprising:

a) a short-range radio communication protocol stack enabling the headset apparatus to interact with other terminals and Access Points using a short-range radio communication packet structure and link controller states;

b) switching means for switching the headset apparatus into an "idle" state in which a non-active connection is established with a paired device for enabling a connection for receiving of streaming data from a streaming data source; and c) communication apparatus for connecting to and receiving the streaming data from the streaming data source.

23. A Bluetooth headset/terminal system adapted for receiving streaming data, comprising:

a) an antenna coupled via a Bluetooth link between a terminal and a to headset apparatus;

b) a short range transceiver connected to the antenna and using a Bluetooth protocol stack enabling the headset to interact with the other terminals and Access Points via a Bluetooth communication packet structure and link controller states;

c) a network transceiver connected to the antenna for network communications;

d) a processor connected to the short range transceiver and the network transceiver, the processor executing software programs stored in a memory for placing the Bluetooth link between the terminal and the headset into a passive or non-active condition enabling the headset to be discoverable and connectable; and e) an I/O system connected to the processor for user input signals and activating the Bluetooth link between the terminal and the headset.

24. The system of claim 23 further comprising:

f) switching means to activate the Bluetooth link if receiving a phone call through the network transceiver g) means to switch received SCO channels of the headset device.

25. A headset apparatus for receiving streaming data, comprising:

a) antenna means linked to terminals and to access points providing streaming data;

b) a short-range radio system coupled to the terminals and to the Access Points via the antenna, the radio system using a Bluetooth protocol stack enabling the radio system to interact with the terminals and the Access Points using the Bluetooth packet structure and link controller states;

c) an I/O system interacting with the Access Points via the radio system for processing and buffering streaming data;

d) a processor controlling and interacting with the radio system and the I/O system, the processor executing stored software programs for placing the headset in a passive or non-active condition with a paired device while receiving streaming data and enabling the headset to be discoverable and connectable; and e) an audio processing system linked to the I/O system via the processor and responsive to a microphone, the audio processing system providing the streaming data as an output to a loudspeaker, after processing by the processor.

26. The headset of claim 25 further comprising:

f) switching means in the I/O system operable to place the headset in a passive or non-active condition with the paired device.

27. The headset of claim 25 wherein the headset has an ID for use in selecting appropriate streaming data from a database for personalized contact delivery in addition to location aware contact delivery.

28. The headset of claim 25 further comprising:

g) a synchronous connection-oriented profile to automatically set the headset in a mode to form or end a connection to the Access Point and/or switch the headset between different content channels of the Access Point.

29. The headset of claim 25 further comprising:

h) means enabling the headset to communicate with the paired device between data packets.

30. The headset of claim 25 further comprising:

i) a host device including a user interface for setting a paired headset in a "beacon listening mode" and/or switching the headset between available content channels from an Access Point.

31. The headset of claim 30 wherein the host device serves as a master device providing a list of available AP channels and enabling a headset user to graphically select an appropriate AP content channel.

32. The headset of claim 30 wherein the host device establishes contact with an Access Point and delivers Access Point content to a paired headset.

33. The headset of claim 30 wherein the host device serves as the interface for the terminal with the Access Point.

34. A short-range wireless communication terminal adapted, comprising:

a) a short-range radio communication protocol stack enabling a terminal to interact with other terminals and Access Points using a short-range radio communication packet structure and link controller states;

b) switching means for switching the terminal into an "idle" state in which a non-active connection is established with a paired device and enabling switching among data channels of a data source while maintaining the non-active connection to the paired device; and c) communication apparatus for connecting to and receiving data from the data source via the short-range communication protocol while maintaining the non-active connection to the paired device.

35. A program product, executable in a computer system, for enabling a short-range wireless communication terminal to receive streaming data, the program product comprising:

a) program code for enabling a terminal to interact with other terminals and Access Points via a short-range radio communication protocol stack using a short-range radio communication packet structure and link controller states;

b) program code for enabling switching means to switch the terminal into an "idle" state in which a non-active connection is established with a paired device and establishing a connection for receiving of streaming data from a streaming data source while maintaining the non-active connection to the paired device; and c) program code for enabling communication apparatus for connecting to and receiving the streaming data from the streaming data source via the short-range communication protocol while maintaining the non-active connection to the paired device.

* * * * *